UNITED STATES PATENT OFFICE 2,038,859

CHROMIFEROUS AZODYESTUFFS

Hugo Schweitzer, Leverkusen-Wiesdorf, Germany, assignor to General Aniline Works, Inc., New York, N. Y., a corporation of Delaware No Drawing. Application July 5, 1935, Serial No. 30,019. In Germany July 12, 1934

3 Claims. (Cl. 260—12)

The present invention relates to new azodyestuffs containing chromium in a complex form, more particularly it relates to dyestuffs which may be represented by the probable general formula

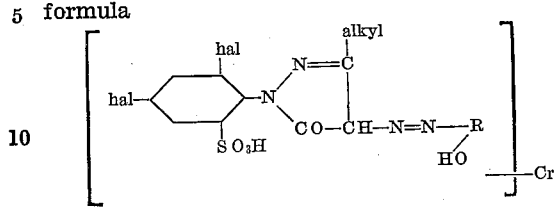

wherein hal stands for a halogen atom and R stands for an aromatic radical bearing the hydroxy group in ortho position to the azo bridge.

My new dyestuffs are obtainable by diazotizing an aromatic orthoaminohydroxy compound, or an alkylether thereof, coupling with a 1-(6'-sulfo-2',4'-dihalogenphenyl) - 3 - alkyl-5-pyrazolone and treating the monoazodyestuff thus obtained with an agent yielding chromium at elevated temperature and under superatmospheric pressure.

The new chromium complex compounds generally dye animal fibres clear shades of good fastness properties.

The invention is illustrated by the following examples, but is not restricted thereto.

Examples 15.4 gs. of 5-nitro-2-aminophenol are diazotized in an aqueous solution of 6.9 gs. of sodium nitrite in the presence of 30 ccs. of crude hydrochloric acid. The diazo compound is introduced into a solution of 32.3 gs. of 1-(6'-sulfo-2',4'-dichlorophenyl) 8-methyl-5-pyrazolone and 52 gs. crystallized sodium acetate in 500 ccs. of water. After the coupling is complete, the dyestuff separated is filtered off with suction and stirred with 1400 ccs. of hot water while adding 14 ccs. of pure concentrated hydrochloric acid, whereupon the suspension is again filtered with suction. The dyestuff paste thus obtained is then heated under pressure in an autoclave with a solution in 350 ccs. of water of chromic formate (corresponding to 15.2 gs. of Cr₂O₃) at 125–130° C. for 3 hours.

After cooling, the crystallized dyestuff is filtered off with suction, thoroughly washed with water, dissolved in a hot aqueous solution of sodium carbonate and separated by the addition of salt.

The dyestuff having in its free state the following formula

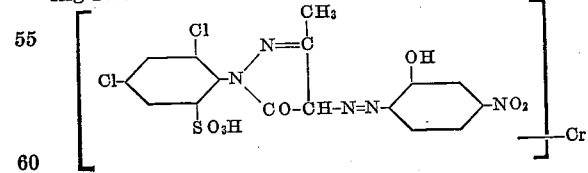

dyes wool very clear bluish-red shades of excellent fastness properties.

If the 5-nitro-2-aminophenol is replaced by other o-aminophenols such as 4-chloro-2-aminophenol, 4-nitro-2-aminophenol or the corresponding phenol ethers such as 5-nitro-2-amino-1-methoxy benzene, 4-chloro-2-amino-1-methoxy benzene or 4-nitro-2-amino-1-methoxy-benzene, dyestuffs of similar properties are obtained.

I claim:

1. Azodyestuffs containing chromium in a complex form, having in the free state the following formula:

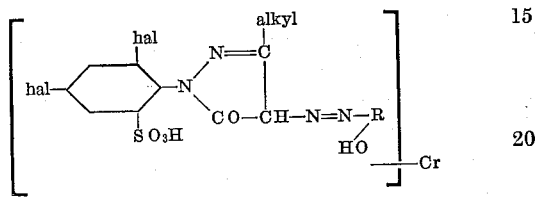

wherein hal stands for a halogen atom and R stand for an aromatic radical bearing the hydroxy group in ortho position to the azo bridge dyeing animal fibres generally clear shades of good fastness properties.

2. Azodyestuffs containing chromium in a complex form, having in the free state the following formula:

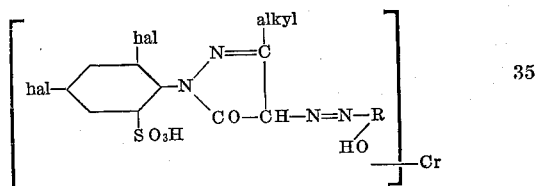

wherein hal stands for a halogen atom and R stands for a radical of the benzene series, dyeing animal fibres generally clear shades of good fastness properties.

3. The azodyestuff containing chromium in a complex form, having in its free state the following formula:

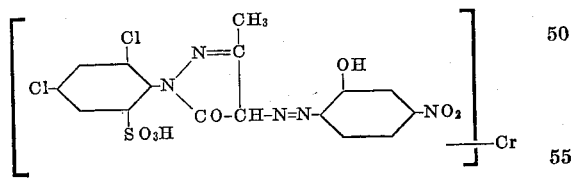

dyeing wool very clear bluish-red shades of excellent fastness properties.

HUGO SCHWEITZER.